United States Patent
El-Sherif et al.

(10) Patent No.: US 10,883,870 B2
(45) Date of Patent: Jan. 5, 2021

(54) HIGHLY DOPED D-SHAPED FIBEROPTIC PROBE FOR HYDROPHONE APPLICATIONS

(71) Applicant: Drexel University, Philadelphia, PA (US)

(72) Inventors: Mahmoud A. El-Sherif, Blue Bell, PA (US); Afshin S. Daryoush, Bryn Mawr, PA (US); Peter A. Lewin, Wyndmoor, PA (US); Rupa Gopinath Minasamudram, Bangalore (IN)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 16/674,053

(22) Filed: Nov. 5, 2019

(65) Prior Publication Data

US 2020/0080887 A1    Mar. 12, 2020

Related U.S. Application Data

(63) Continuation-in-part of application No. 15/477,247, filed on Apr. 3, 2017, now Pat. No. 10,466,096, and a continuation-in-part of application No. 14/159,649, filed on Jan. 21, 2014, now Pat. No. 9,823,113, which is a continuation of application No. 13/150,906, filed on Jun. 1, 2011, now Pat. No. 8,661,908.

(60) Provisional application No. 62/317,516, filed on Apr. 2, 2016, provisional application No. 62/310,287, filed on Mar. 18, 2016, provisional application No. 61/350,422, filed on Jun. 1, 2010.

(51) Int. Cl.
*G02B 6/26* (2006.01)
*G01H 9/00* (2006.01)

(52) U.S. Cl.
CPC ............ *G01H 9/004* (2013.01); *G02B 6/262* (2013.01)

(58) Field of Classification Search
CPC ................................ G02B 6/262; G01V 1/186
See application file for complete search history.

(56) References Cited

U.S. PATENT DOCUMENTS

| | | | | |
|---|---|---|---|---|
| 5,812,724 A * | 9/1998 | Ohtsu | ............... | B82Y 20/00 385/128 |
| 6,236,783 B1 * | 5/2001 | Mononobe | ............ | G01B 11/30 385/123 |
| 6,912,345 B2 * | 6/2005 | Dautartas | ............ | G02B 6/2552 385/43 |
| 2009/0022456 A1 * | 1/2009 | Schmadel | ............ | G01Q 60/22 385/43 |

* cited by examiner

*Primary Examiner* — Ellen E Kim
(74) *Attorney, Agent, or Firm* — Schott, P.C.

(57) ABSTRACT

The fiber optic probe detects changes in ultrasound pressure in an immersion medium such as a liquid, a gas, or a solid, where the system includes an optical fiber probe having a fiber of the probe has a highly doped (or regular) core with a diameter in the range 5 to 10 μm and a clad diameter equal to or more than 50 μm; and the optical fiber tip has been modified in a D-shaped (or V-shaped) structure where the clad material has been removed from one side of the cylindrical fiber to the surface of the fiber core; then, this modified region of the fiber is coated, with a very thin layer of a metallic material, ranging from 3 to 10 nm.

8 Claims, 5 Drawing Sheets

HIGHLY DOPED D-SHAPED FIBEROPTIC PROBE FOR HYDROPHONE APPLICATIONS

CROSS-REFERENCE TO RELATED APPLICATIONS

This application is a continuation-in-part application of U.S. Pat. No. 10,466,096 that issued on Nov. 5, 2019, which is a continuation-in-part of U.S. Pat. No. 9,823,113 that issued on Nov. 21, 2017, which is a continuation of U.S. Pat. No. 8,661,908 that issued on Mar. 4, 2014, which claims the benefit of U.S. provisional application 61/350,422 filed on Jun. 1, 2010. U.S. Pat. No. 10,466,096 claims the benefit of U.S. provisional applications 62/310,287 filed on Mar. 18, 2016 and 62/317,516 filed on Apr. 2, 2016. All of the above patents and applications are incorporated by reference as if fully set forth herein.

TECHNICAL FIELD

The disclosed inventions are in the field of acousto-optic devices for detecting acoustic/ultrasound pressure for biomedical imaging, hydrophone and/or sonar applications, systems calibration, communication, pressure sensor applications, and the like.

BACKGROUND

Hydrophone devices can detect acoustic/ultrasound wave pressure in any medium, such as gases or liquids or even solids. Several different types of hydrophone devices are known in the art. New hydrophone applications in sensing of acoustic wave pressure in gases, liquids and solids, including clinical, sonar, and communication applications require more sensitive and improved hydrophones. Such applications are systems' calibration, metrology, medical metrology, elasticity of medium, imaging, sonar, detection, therapy, diagnosis, and the like.

One type of hydrophone devices, known in the art, is the piezoelectric hydrophone device. Piezoelectric hydrophones may be used for measurement of large frequency bandwidths; however, problems arise from the generation of high temperatures and cavitation effects that are produced by High Intensity Focused Ultrasound (HIFU) fields, High Intensity Therapeutic Ultrasound (HITU) fields, lithotripter fields or the like. These problems generally could lead to device failure due to high pressure amplitudes. Currently, such devices tend to be costly and cumbersome, and tend to have large apertures which create another problem by spatial averaging certain acoustic fields. For example, existing hydrophone probes have aperture diameters on the order of about 500 µm or more which introduces spatial averaging of acoustic fields beyond 3 MHz. This spatial averaging can lead to errors in detection and faithful reproduction of the pressure-time waveform of the measured acoustic wave and result in poor spatial resolution.

Recently, new types of acoustic pressure sensors have been proposed for high frequency hydrophone applications. These sensors are mainly fiberoptic pressure sensors. Regardless of claimed improved performance in hydrophone applications, most of these fiber optic sensors, if not all, are not ready for application because of other limitations. These sensors can be classified based on the sensing mechanism and/or the applied detection technique. An example of the sensing mechanism to be considered is the acousto-optic effect in hosting medium, inducing changes in optical wave refraction and other optical properties. This can result in amplitude, phase and/or wavelength modulation of optical signals.

Also, hydrophone sensors can be classified based on the detection technique of modulated optical signals. Examples of these detection techniques are; amplitude and phase demodulation as well as detection/demodulation of the signal wavelength changes.

The detection/demodulation technique used with amplitude modulated sensors is based on using varieties of photodetectors. However, for the phase modulated pressure sensors the detection/demodulation technique is based on using varieties of interferometers such as; Mach-Zehnder, Michelson or Fabry-Perot interferometers.

For the wavelength modulated pressure sensors, the fiber optic hydrophone device performs acoustic pressure sensing based on an acoustically induced change in the wavelength of optical signals passing through the given medium. The demodulation technique employs external Bragg's cells or fiber Bragg gratings (FBGs). Also, distributed Bragg reflectors have been proposed.

Regardless of the large number of developed fiberoptic hydrophones each of them has some advantages and some limitations. In most cases, the limitations are more than acceptable, and preventing the use of such hydrophones in real application.

For example, most of the wavelength demodulation hydrophone sensors (FBGs) are distributed along the length of the fiber and have sensing dimensions on the order of few millimeters. The typical range for sensing regions in wavelength modulated signals is on the order of about 600 µm to about 3 mm. This large sensing dimension causes the sensors to suffer from poor spatial resolution thus limiting the resolution bandwidth. For this reason, wavelength modulated fiber optic hydrophones cannot be used in many ultrasound applications.

Recent development of fiberoptic hydrophones in the patents mentioned above show a fiberoptic hydrophone constructed of thin optical fiber coated with a semitransparent metallic material. The sensor has shown excellent results with much higher sensitivity than most recorded inventions in the field. The developed technique provides a new method and new system for detecting changes in ultrasound pressure in an immersion medium, using a special fiberoptic probe. The method comprises: contacting the immersion medium with a fiberoptic probe, wherein the fiber is modified to reduce the fiber diameter in the area of the probe tip to a diameter less than 10 µm, by removing the fiber jacket and most of the clad material. Then, the fiber tip is coated with a very thin layer of metallic material of a thickness in the range of 2-7 nm. Then, the fiberoptic probe is integrated with a light source and a detection system for the detection of the acoustic pressure in any medium having a surface contact with the fiber tip. Wherein, the detecting of the acoustic pressure in the immersion medium is based on; (a) induced changes in optical signals based on the interaction between evanescent electromagnetic fields, penetrate outside the fiber surface, and the ultrasound waves propagating in the immersion medium, and (b) detecting changes in the Fresnel back reflected optical signals, reflecting off the end face of the fiber probe.

While this fiberoptic hydrophone has resulted in a very sensitive mechanism in measuring the acoustic pressure in immersion medium it has some limitations for general applications in acoustic pressure measurements. The limitations are based on the structural mechanical weakness, under exposure to a high acoustic energy or harsh environment, because of the fiber tip diameter is less than 10 μm.

Therefore, what is needed is to modify the structure of the fiber thin tip, of the previously developed fiberoptic hydrophone, to improve the mechanical strength, without changing the sensor response and/or sensitivity. The new design would have the same metallic coating onto the tip of a newly designed fiber probe. The new probe' tip structure would have a completely different but innovated design, for much better mechanical support of the fiber probe for real field applications, while having the same sub-micron resolution and high sensitivity.

In this way, the newly invented pressure sensor would be able to characterize high energy acoustic fields, and even under harsh environmental conditions, in a wide frequency rang up to 100 MHz. In addition, this invented hydrophone would eliminate all types of spatial averaging at high frequencies, which exists with all piezoelectric hydrophones.

SUMMARY

In the patents mentioned above, a very thin fiber tip was used as the fiberoptic hydrophone tip, wherein, the fiber tip has a diameter of 10 μm or less, due to etching most of the clad material off the cylindrical shape (i.e. 360-degree angle) of the fiber. While this structure has shown an excellent sensitivity to acoustic pressure measurements, it has resulted in a structural weakness to any mechanical stresses, because of the thin fiber tip, which can be broken in harsh environment or under high energy of ultrasound waves.

In the newly invented design, the mechanical strength of the fiber tip has been improved by modifying the structure of the fiber tip, by using a special type of commercially available highly doped fiber (or regular fiber) shaped into a D-shaped (or V-shaped) structure by removing the cladding from a limited surface area of the side of the core of the fiber tip. Using a D-shaped (or V-shaped) fiber has resulted in a much higher mechanical strength without affecting the probe sensitivity and/or resolution. The probe sensitivity and resolution are dependent on the total exposed surface area of the fiber core, in contact with the immersion medium. Which means that the D-shaped (or V-shaped) fiber tip will be much longer than what is used in the previous design (wherein all the cladding was removed completely in 360 degree angle), to satisfy the equality of the exposed surface area of the core to the immersion medium.

Accordingly, the present invention provides systems for detecting changes in ultrasound pressure in an immersion medium such as a liquid, a gas, or a solid, wherein, the system comprising: an optical fiber probe, wherein the fiber of the probe has a highly doped (or regular) core with a diameter in the range 5 to 10 μm and a clad diameter equal to or more than 50 μm; and the optical fiber tip has been modified in a D-shaped structure; wherein, the clad material has been removed from one side of the cylindrical fiber to the surface of the fiber core; then, this modified region of the fiber is coated, with a very thin layer of a metallic material, ranging from 3 to 10 nm. This coating is very thin to satisfy the condition of semitransparent to optical signals propagating within the fiber core. The coated is applied to the modified side surface as well as the end face of the fiber tip. The thickness of the metallic coating on the side surface is adjusted to maximize the response of evanescent electromagnetic field, exists outside the fiber core, to ultrasound pressure propagating in immersion medium in contact with the fiber tip. Also, the thickness of the semitransparent coating at the end face of the fiber is adjusted to maximize the response of Fresnel back reflection to changes in the pressure of ultrasound waves propagating in the immersion medium in contact with the fiber tip. The thickness of the metallic coating is adjusted for improved responses to changes in the acoustic waves' pressure. The response is also a function of the geometry and materials properties of the fiber and the immersion medium, as well as the frequency of the ultrasound waves propagating in the immersion medium and the wavelength of the optical signals propagating within the fiber core.

This fiber probe is detecting changes in acoustic pressure in an immersion medium, based on resulted changes in the intensity, phase, and/or wavelength of back reflected optical signal, within the fiber core.

In another embodiment of the systems for detecting changes in ultrasound pressure in an immersion medium such as a liquid, a gas, or a solid, the system comprising: an optical fiber probe, wherein, the fiber has a highly doped (or regular) fiber core with a diameter in the range 5 to 10 μm and a clad diameter equal to or more than 50 μm; and the optical fiber tip has been modified in a V-shaped structure, wherein the clad material has been removed for more than 180 (about 240+30) degree angle, around the fiber core surface; this modified region at the tip of the fiber is coated, from the side surface as well as the end face of the fiber, with a very thin layer of metallic material, ranging from 3 to 10 nm, satisfying semitransparent coating conditions, to optical signals within the fiber core. The thickness of the semitransparent metallic coating on the side surface of the fiber tip is adjusted to maximize the response of evanescent fields, of optical signals propagating within the fiber core, to ultrasound pressure in immersion medium in contact with the fiber/probe tip. Also, the thickness of the semitransparent coating at the end face of the fiber is adjusted to maximize the response of Fresnel back reflection to changes in pressure of ultrasound waves propagating in immersion medium in contact with the fiber tip. The thickness of the metallic coating is adjusted for improved responses to changes in the acoustic waves' pressure. The improved response is a function of the geometry and materials properties of the fiber and the immersion medium, as well as the frequency of the ultrasound waves propagating in the immersion medium and the wavelength of the optical signals propagating within the fiber core.

This fiber probe is detecting changes in acoustic pressure in an immersion medium, based on resulted changes in the intensity, phase, and/or wavelength of back reflected optical signal, within the fiber core.

The present invention also provides for methods for detecting changes in pressure in an immersion medium, such as a liquid or gas, or in a solid (collectively media or medium), the method comprising: an optical fiber probe, wherein the fiber has a highly doped (or regular) fiber core, which has a core diameter in the range 5 to 10 μm and a clad diameter of more than 50 μm; and the optical fiber tip has been modified in a D-shaped or V-shaped fiber structure; wherein, the clad material has been removed from one side of the cylindrical fiber to the surface of the fiber core, for a D-shaped fiber tip; this modified region at the tip of the fiber is coated, from the modified side surface as well as the end face of the fiber, with a very thin layer of metallic material, ranging from 3 to 10 nm, satisfying semitransparent coating conditions, to optical signals propagating within the fiber core. The thickness of the semitransparent metallic coating on the side surface of the fiber tip is adjusted to maximize the response of evanescent electromagnetic field to ultrasound pressure in immersion medium in contact with the tip of the optical fiber probe. Also, the thickness of the semi-transparent coating at the end face of the fiber is adjusted to maximize the response of Fresnel back reflection to changes in pressure of ultrasound waves propagating in immersion medium. The thickness of the metallic coating is adjusted for improved responses, depending on the geometry and materials properties of the fiber and the immersion medium, as well as the frequency of the ultrasound waves propagating in the immersion medium and the wavelength of the optical signals propagating within the fiber core.

The developed system detects changes in acoustic pressure in an immersion medium based on changes in the evanescent electromagnetic field as well as changes in Fresnel back reflection, resulting in changes in the intensity, phase, and/or wavelength of back reflected optical signal, within the fiber core.

In another embodiment of the method for detecting changes in ultrasound pressure in an immersion medium such as a liquid, a gas, or a solid, the system comprising: an optical fiber probe, wherein the fiber has a highly doped (or regular) fiber core, which has a core diameter in the range 5 to 10 µm and a clad diameter of more than 50 µm; wherein, the fiber clad material is removed-off for more than 180 (about 240+30) degree angle, around the fiber core surface, for the V-shaped fiber tip; this modified region at the tip of the fiber is coated, from the side surface as well as the end face of the fiber, with a very thin layer of metallic material, ranging from 3 to 10 nm, satisfying semitransparent coating conditions to optical signals propagating within the fiber core. The thickness of the semitransparent metallic coating on the side surface of the fiber tip is adjusted to maximize the response of evanescent fields to ultrasound pressure in immersion medium in contact with the tip of the optical fiber probe. Also, the thickness of the semitransparent coating at the end face of the fiber is adjusted to maximize the response of Fresnel back reflection to changes in pressure of ultrasound waves propagating in immersion medium in contact with the fiber tip. The thickness of the metallic coating is adjusted for improved responses depend on the geometry and materials properties of the fiber and the immersion medium, as well as the frequency of the ultrasound waves propagating in the immersion medium and the optical signals propagating within the optical fiber core.

It is disclosed that the invited systems and methods have many innovative features and advantages based on using highly-doped optical fiber core in a D-shaped or V-shaped fiber tip/probe for sensing ultrasound pressure in any immersion medium and/or calibration of ultrasound sources. The features and advantages are many and not limited to the following:

The highly doped fiber core is used based on an optical signal propagation property. Highly Doped fiber cores have a higher refractive core index than the index of the cladding material. This will result in focusing the optical signal more around the fiber core axis. Also, this will result in limiting the penetration of the evanescent field into the fiber cladding layer to only few microns. The advantage of this property is to eliminate the effect of ultrasound waves touching the cladding surface. Which means that most of the cladding surface act as a dummy material, even with large flat surface area in the D-shape fiber probe. Therefore, this will result in eliminating spatial averaging of any acoustic fields in touch with the flat cladding surface, the D-shaped sensor has a strong mechanical support to the fiber probe than what claim before in the previous patents, wherein the cladding material is removed off the tip of the fiber core in the probe sensing area, the D-shaped sensor has a little better mechanical support than the V-shaped fiber tip, and can be used in much harsh environment conditions or whenever the energy of the ultrasound wave is very high, the V-shaped sensor will have a little better response than the D-shaped one, if they both have the same length of the fiber tip, because of the larger surface area exposed of the fiber core to the immersion medium, this difference in response between D-shaped and V-Shaped sensors can be addressed by using longer modified D-shaped fiber tip to match total exposed surface area in contact with immersion medium with that in the V-shaped case.

It depends on the application requirements and preferred properties for each application, the V-shaped sensor has a better sensing conditions at ultra-high frequencies of ultrasound waves (in range about 50-100 MHz), because using V-shaped surface eliminate completely any sort of spatial averaging of certain acoustic fields, by limiting the flat surface area in one half of what exposed in the D-shaped sensor, even if the evanescent field penetration is limited to few microns and the cladding is considered as a dummy material except for the few microns next to the core surface, due to the penetration of evanescent field in few microns next to the core. It depends on the application requirements and applied ultrasound frequency, this newly developed ultrasound pressure and calibration sensor can be integrated with various coherent or non-coherent light source as well as the proper detection/demodulation/analyzing system, as needed for a specific application, and combining these features in one fiber optic probe, will result in a system that can be used in many applications, as mentioned in the summary and many others a like or different applications in the future.

It is also clear that the response of the sensor depends on the surface area of the core in direct contact with the immersion medium. Therefore, by adjusting the length of each of the modified fiber tip (whatever D-shaped or V-shaped), in order to match the exposed area of any of them, which is in contact with the immersion medium, with the total core surface area, as the case of removing all the clad material off fiber tip, we can satisfy the same sensor response, as recorded in the earlier patents.

Therefore, proof of concept has been completed in our previous research work. Experimental testing of a fiber optic hydrophone, based on similar sensing mechanisms, has shown a highly sensitive system for detection of ultrasound pressure at high frequencies. The new designs are using the same sensing mechanisms, while covering part of the core surface area to improve the mechanical strength. Covering part of the core surface area will not change the sensor sensitivity or resolution, if the total exposed surface areas of the fiber (D-shaped or V-shaped) core in contact with the immersion medium can match with the same total areas exposed in the previous patents. This can be achieved by increasing the length of the fiber tip of V-shaped or D-shaped sensor to match with exposed area in case of removal of the all clad material.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
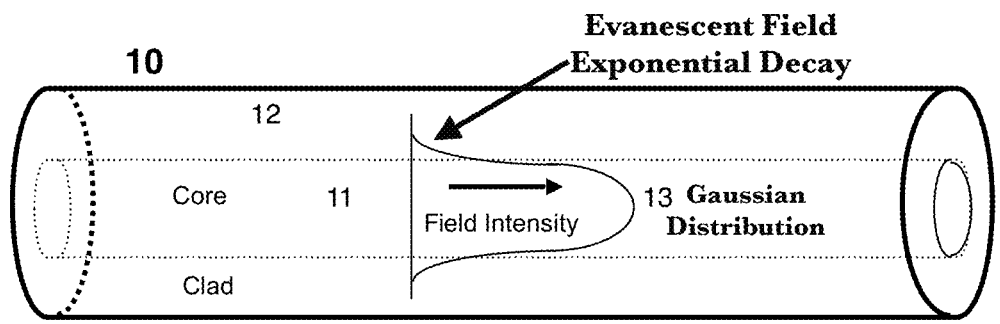
FIG. 1 is a schematic of a special highly dropped single mode optical fiber, including a schematic of the Gaussian field intensity distribution within the fiber core, and exponential decay of the evanescent field outside the core, wherein, the highly doped core has a much faster exponential decay of evanescent field in the cladding than regular optical fiber.

A number of special fiberoptic probe structures shown in the figures. They are highly sensitive to changes in ultrasound pressure up to 100 MHz. The tip of the fiber probe has different designs and structural materials. It is made of a highly doped (or regular) optical fiber, wherein the fiber tip can be etched, or not, into a conical shape and modified in a D-shaped or V-shaped fiber structure. Wherein, the cladding material of the fiber tip has been removed from one side of the cylindrical fiber tip, resulting in a D-shaped cross-section fiber tip, or removed from more surface area of the fiber core, resulting in a V-shaped structure. Then, the surface area of the fiber tip is coated with a very thin layer of metallic material, acting as a semitransparent and partially reflecting coating. The combination of the highly doped fiber core with a D-shaped or V-shaped structure, in addition to a semitransparent coating, can provide a highly sensitive pressure sensor for measuring ultrasound pressure up to 100 MHz without facing the problem of spatial average of acoustic fields. The designs and advantages of using highly doped fiber core in the sensory tip with a D-shaped or V-shaped structures are explained next.

In regular optical fiber, while the optical signals are propagating within the fiber core, the evanescent electromagnetic field penetrates into the fiber cladding and result in a much larger effective and active fiber cross-sectional area, which is much larger than the fiber core cross-section. The penetration of the evanescent field in the cladding depends on the difference in refractive index between the core and the clad materials, the less the difference the more the penetration. For regular single mode optical fibers used in telecommunication application, the fiber is made of glass. The core material is doped with other materials to increase the core's refractive index by about a 0.35% to 0.5%, or even 1.0%. For those regular fibers the penetration of the evanescent field in the clad material can range from 10 μm to 30 μm or even more.

Therefore, the diameter of the actual effective/active area, at the fiber end face, is not just the core diameter (about 5 μm to 8 μm), by adding the radial penetration of the evanescent field in the fiber cladding layer. Because of that it was better in our previous work to remove all the clad material at the fiber tip, to limit the active sensory area to the fiber core cross-section. Otherwise, the pressure sensor will have a reasonably large aperture which can result in spatially averaging at higher frequencies of the ultrasound waves. The use of a highly doped fiber core can reduce the penetration of evanescent field in the clad layer to few micrometers, say 2-5 μm, for the effective level of evanescent fields. In this case, the diameter of the sensor aperture, at the end of the fiber, will be in the range of 10 μm+few micro, and there will be no need to etch all the clad material to reduce the effective aperture size, avoiding the spatial averaging problem.

Therefore, the selection of the highly doped core has the advantage of limiting the effective aperture cross-sectional area at the end of the fiber, and therefore, there will be no need to remove all the cladding completely to avoid the spatially average problems with high ultrasound frequency. This means that the cladding surface area, at the end of the fiber, will act as a dummy material, except for few microns (2-4) next to the core surface. When using a highly doped single mode fiber with 5.5 μm core diameter, the diameter of the active area will be in the range of 8-12 μm. Therefore, there will be no need for etching all the cladding material, which will provide the proper mechanical support to the fiber tip. However, it is preferred to have a little conical taper structure at the end of fiber tip, to limit any ultrasound interference between incident and reflected ultrasound waves, in the medium outside the fiber tip. The conical taper angle can range from 20 to 45 degree, or others, based on the geometrical structure of the medium surrounding the fiber tip.

As explained before, the sensory mechanisms are based on two major factors; (a) the direct interaction between evanescent fields and ultrasound waves in the immersion medium, from the side surface of the fiber tip, and (b) the direct Fresnel reflection at the fiber end face, based on the acousto-optic effect, inducing change in optical properties of all materials; optical fiber tip, metallic coating, and immersion medium. Therefore, instead of etching all the clad material at the fiber tip, as it was done in our old development, exposing the evanescent fields to immersion medium in 360 degree angle of the cylindrical structure of the fiber, resulting in mechanical weakness of the fiber tip, the D-Shaped structure was designed to facilitate direct interaction between evanescent fields and immersion medium, from one side of the D-shaped fiber tip. This D-shaped structure will provide enough mechanical support to the fiber tip. This means that, instead of etching all the cladding material on a short length of the fiber tip, as was done in the old case, the D-shaped etching will be applied to a much longer length of the fiber tip in order to match the surface area, exposed to the immersion medium, with the old case when the cladding was totally removed in 360 degree angle. Matching the exposed surface area can result in the same sensitivity to ultrasound pressure. Therefore, by using a D-shaped fiber probe, the fiberoptic probe tip can withstand any expected harsh environment within the testing medium, while facilitating direct interaction between evanescent fields and ultrasound waves in the medium outside the fiber surface, which is a very sensitive mechanism to changes in the ultrasound pressure.

In an embodiment of the fiber pressure sensor, the V-shaped structure is designed to increase the fiber surface exposure to immersion medium. This design can be applied whenever the energy of the ultrasound wave is not high and at less harsh environmental conditions. The advantage of the V-shaped fiber tip over the D-shaped structure is that the exposure area can be almost double or more for the same fiber length, which means that the length of the sensing tip can be shorter than in the case of D-shaped structure, in case of satisfying the condition of equality of surface exposure area of the old case. Wherein, the V-shaped fiber tip can be applied in case of less harsh environmental conditions, and the length of the fiber tip will be shorter than the case of D-shaped structure, for the same sensitivity. There are many factors controlling the length of the fiber tip of the hydrophone probe to maximize the sensitivity and resolution in measuring ultrasound pressure. These factors range from materials properties of the fiber tip core, clad, metallic coating, and the immersion medium to the structural geometry of the core, length of the D-shaped or V-shaped fiber tip, and the thickness of the metallic coating, in addition to the frequency of the ultrasound waves and the wavelength of the optical signal.

In an embodiment, to enhance the signal back reflection and maximize the sensitivity of the sensor to ultrasound pressure, the probe tip, whatever D-shaped or V-shaped, is coated with a very thin layer of a metallic material such as gold, aluminum, titanium, and other combinations of alloys and conductive materials. The thin coating is acting as a semitransparent (or partial reflecting) coating. The thickness of the semi-transparent coating is adjusted to maximize interaction between evanescent fields (of optical signals propagating within the fiber core) and ultrasound waves in immersion medium, and at the same time, providing a reasonable back reflection of modulated optical signals from the side wall of the D-shaped (or V-shaped) surface area. In addition, the very thin coating at the fiber end face is adjusted to maximize the direct interaction between the optical reflected signals and the medium outside the fiber end. The coating thickness is adjusted to maximize the direct interaction between the optical signal and ultrasound pressure outside the fiber end, while at the same time, satisfying the condition of reasonable back reflected of optical modulated signal. The strength of the back reflected modulated is adjusted to maximize the sensor sensitivity and resolution. The thickness of the metallic coating material may range from 3 nm to 10 nm or others depending on the type of the material. Therefore, the thickness of the coating is directly affecting the sensor sensitivity, because of the direct impact of the thickness on the two well-known mechanisms; (a) direct interaction of ultrasound waves with evanescent electromagnetic fields, and (b) Fresnel back reflection based on induced changes in materials properties, as a result of the acousto-optic effect.

The interaction between optical signals propagating within the fiber core and ultrasound wave propagating in the immersion medium, whatever through the direct interaction at the fiber end face or through the exposure of the evanescent fields from the side surface of the D-shaped or V-shaped fiber tip, will result in modulating the back reflected signals within the fiber core.

The optical modulation of the back reflected signals, whatever it is intensity, phase, or wavelength modulation, can be demodulated in the output devices of the sensory system. The demodulated optical signals can be calibrated and correlated to the changes in the pressure of the ultrasound waves in immersion mediums as well as calibration of any ultrasound source or hydrophone. In some applications, the sensor output readings are directly correlated to the ultrasound echo/pressure, which can be analyzed in case of imaging applications for the reconstruction of the target image. The newly developed fiber optic probe can be used in many hydrophone applications, ranging from a biomedical imaging and diagnostics to industrial and military applications, as well as sonar and hydrophone calibration and many others. In addition, the imaging system can be constructed of a number of fiber optic pressure sensors, arranged in 1-D or 2-D array for large surface scan or 3-D imaging. The detailed description of the drawings is presented next.

It should be understood that the configurations and/or approaches described herein are exemplary in nature, and that these specific embodiments or examples are not to be considered limiting. The specific routines or methods described herein may represent one or more of any number of strategies. As such, various acts illustrated may be performed in the sequence illustrated, in other sequences, in parallel, or the like. Likewise, the order of the above-described processes may be changed. Additionally, the subject matter of the present disclosure includes combinations and sub-combinations of the various processes, systems and configurations, and other features, functions, acts, and/or properties disclosed herein, as well as equivalents thereof. It is to be understood that this invention is not limited to the specific devices, methods, applications, conditions or parameters decried and/or shown herein, and that the terminology used herein is for the purpose of describing particular embodiments by a way of example only and is not intended to be limiting of the claimed invention.

FIG. 1 depicts a schematic drawing 10 of a highly doped single-mode optical fiber, wherein, the fiber is constructed of a fiber core 11, and a fiber clad 12. The schematic distribution of the electromagnetic field intensity 13 is showing a Gaussian distribution within the fiber core, and a fast-exponential decay of evanescent field in cladding layer, next to the core surface. The higher the doping in the core, the higher refractive index difference between the core and the clad materials, the faster the decay of the evanescent field and the less the penetration of the field into the cladding material. This was the reason for using a highly dropped fiber core for limiting the penetration of the evanescent fields in the fiber cladding layer.

Figure 2:
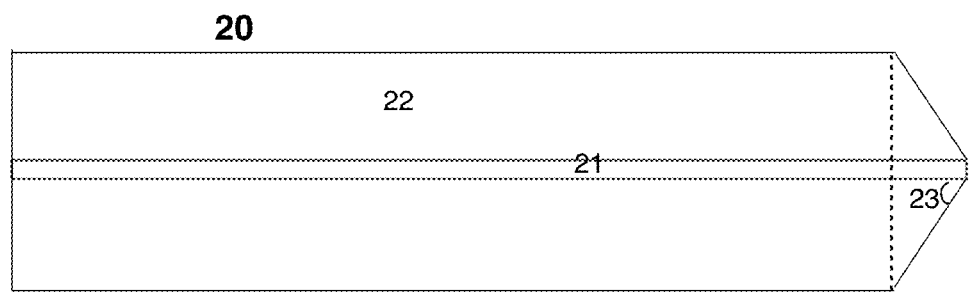
FIG. 2 is a schematic of the cross section of the single mode optical fiber, after conical etching of the tip of the fiber cladding at an etch angle about 60 degrees (23), can be less or more than 60 degrees.

FIG. 2 depicts a schematic longitudinal cross-section of a highly doped single mode optical fiber 20, having a core 21 and a clad material 22, wherein, the fiber has a conical/tapered end 23. The conical taper angle can range from 20 to 45 degree, or others, based on the geometrical structure of the fiber and the medium surrounding the fiber tip. Tapering the tip of the optical fiber is a must in case of using a regular optical fiber, however, in case of using a highly doped fiber it can be done to avoid multiple reflections of the ultrasound in case of strong signals, as well as limiting interference between incident and reflected ultrasound waves in the medium next to the fiber end face.

Figure 3:
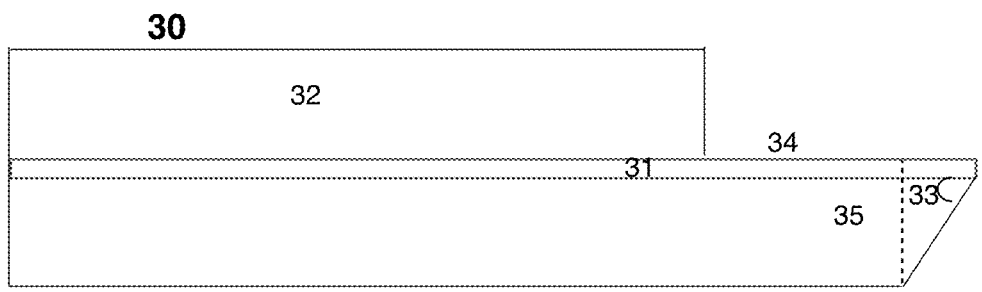
FIG. 3 is a schematic of the cross section of the modified optical fiber tip, after side-etching of the cladding is completed, resulting in a D-shaped structure of the highly dropped or regular fiber.

FIG. 3 depicts a schematic longitudinal cross section of a D-shaped fiber probe 30, having the core 31 and the clad 32, wherein, the cladding of the fiber tip, which has a tapered end 33, has been removed-off the fiber core from one side of the fiber, leaving a plane surface 34 next to the fiber core, and constructing a D-shaped fiber tip. This D-shaped fiber tip is required to facilitate direct interaction between optical signals within the fiber core and ultrasound waves in immersion medium, through evanescent fields penetrating into the immersion medium, and at the same time, the clad on the other side of the core provide the required technical support to the fiber sensing tip. Removing the cladding, from one side of the fiber, can be done by one of the well know masking and etching methods, whatever dry etching or wet etching method or others.

Figure 4:
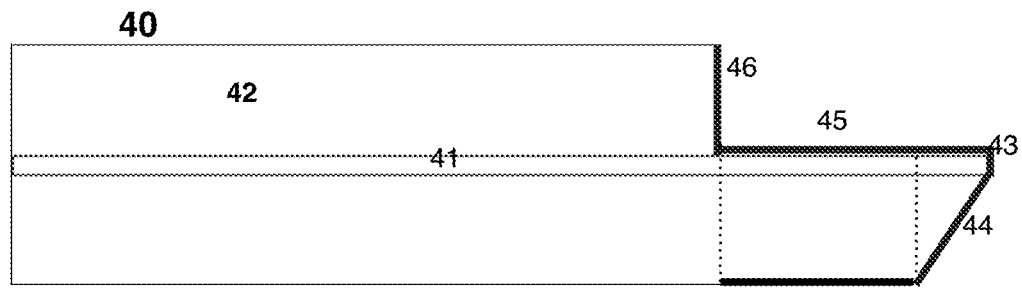
FIG. 4 is a schematic cross section of the modified optical fiber with D-shaped tip, after coating the modified fiber tip with a thin layer of semitransparent gold, or ITO or any other metallic or dielectric material.

FIG. 4 depicts a schematic of the fiber cross-section, shown in FIG. 3, after the D-shaped tip is coated with gold or other metallic or nonmetallic material 40, wherein, the D-shaped fiber tip, which has a core 41 and clad 42, is coated at the end of the fiber core 43 with a very thin layer of gold or any other metallic or nonmetallic material. Also, the surface area at the end of the fiber clad (whether angled 44 or flat 46) is coated with gold or any other metallic or nonmetallic material. In addition, the flat side surface 45 of the D-shaped fiber tip is coated too, as well as the surface of the cylindrical side, with gold or other materials. One of the well-known techniques in the art of coating, such as plasma sputtering or plasma deposition or others, can be used for coating the fiber tip. However, it should be done carefully and with full control on the coating thickness. In order to maximize the sensor sensitivity, the coating thickness has to be very thin, in the range of 3 nm to 10 nm or others, to be able to act as a semitransparent coating or semi reflecting metallic coating. This can maximize the interaction between the fields of optical signals in the fiber core and the ultrasound waves in the immersion medium. The coating thickness is based on many factors and is directly related the materials properties of the coating and the immersion medium, as well as the wavelength of the optical signals, and other indirect geometrical and environmental factors.

Figure 5:
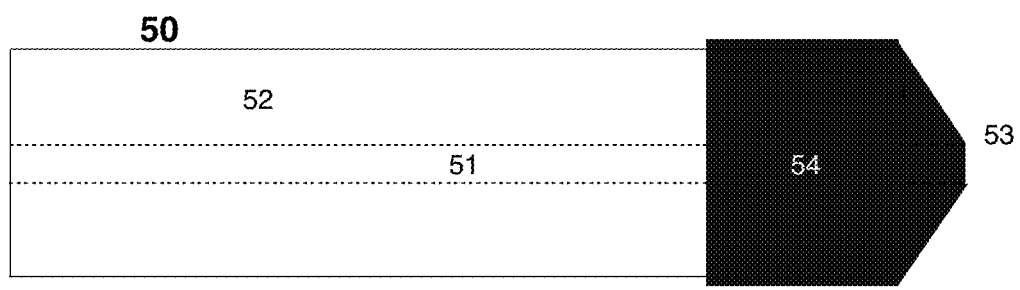
FIG. 5 is a schematic of the top view of the modified coated D-shaped fiber tip, after coating with a thin layer of gold or metallic conductor of the fiber tip shown in FIG. 4.

FIG. 5 depicts a schematic top view 50 of the optical fiber shown in FIG. 3, wherein the fiber core 51 and the fiber clad 52 are coated at the end and the side surface area of the D-shaped tip with a very thin layer of gold or metallic material 53 and 54, respectively.

Figure 6:
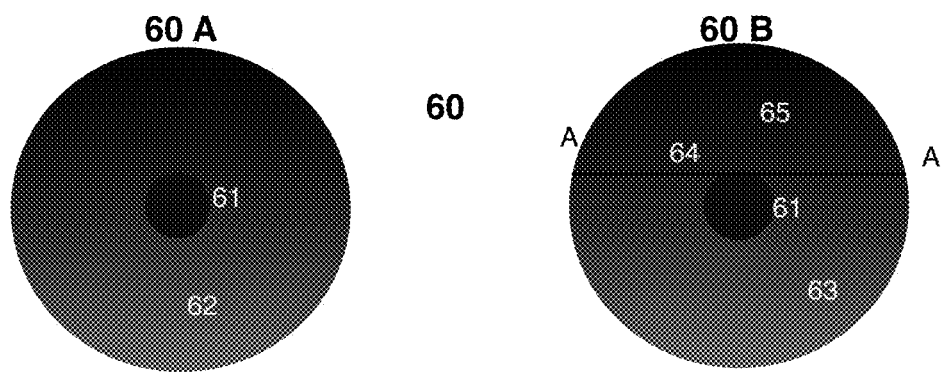
FIG. 6 is a schematic side view from the end face of the fiber tip, before (left) and after (right) etching in D-shaped structure at the plane A-A, which was performed on a small length of the fiber tip, creating a D-shaped fiber tip.

FIG. 6 depicts a schematic view from the fiber end face before 60A and after 60B the fiber tip was modified to a D-shaped structure, as shown in FIG. 3, wherein the fiber core and clad before modification are 61 and 62. In the 60B figure, the line A-A 64 represent the flat plane surface of the etched area next to the fiber core, wherein, the area under this line A-A represent the D-shaped cross-section of the fiber tip, and the non-etched cladding area is 63, and on the other side of the line A-A is the etched clad area is 65.

Figure 7:
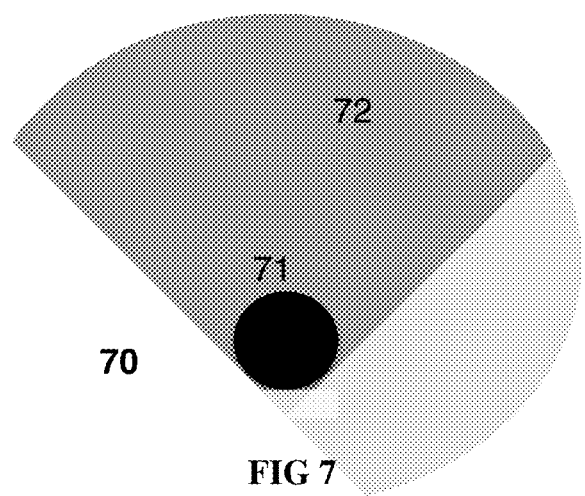
FIG. 7 is a schematic of cross-section of a V-shaped fiber to increase the surface area for more evanescent filed exposure to the immersion medium out-side the fiber surface, which was performed on a small length of the fiber tip, creating the V-shaped fiber tip.

FIG. 7 depicts a schematic of the fiber cross-section for a V-shaped fiber tip 70, showing the fiber core 71 and clad 72, wherein, most of the cladding has been removed to increase the exposure of evanescent fields off the fiber core to immersion medium. It is clear from FIGS. 6 and 7 that the core surface area, in contact with the immersion medium, in the V-shaped structure is much larger than the case of the D-shaped fiber tip and can be double or triple the core surface area exposed to the immersion medium. However, on the other hand the mechanical support of the fiber tip in the D-shaped structure is much more than in the case of the V-shaped fiber. Therefore, the D-shaped sensor tip is preferred for application with high ultrasound energy and harsh environmental conditions. At the same time, to maintain the same level of sensor sensitivity, whatever D-shaped or V-shaped, the total exposed core surface area to immersion medium would be the same, which means that the D-shaped fiber tip will be longer than the V-shaped fiber tip. Also, in order to maintain the sensor sensitivity is the same for any of the three different designs (D-shaped, V-shaped and the old case where all the cladding has been removed) both of the D-shaped and V-shaped fiber tip would have the same core surface area in contact with the immersion medium, which means that the they have longer fiber tip. Keeping in mind that the only limitation on the old design is that, the old design has the structural weakness, that might not survive harsh environmental conditions.

Figure 8:
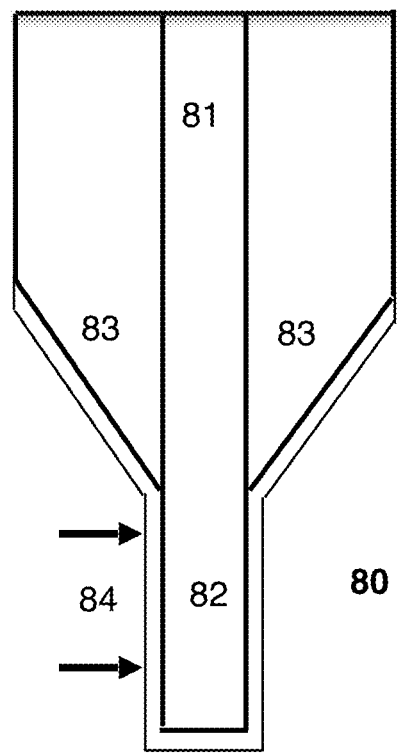
FIG. 8 is a schematic of cross-section of the single mode fiber tip used in a fiber optic hydrophone, wherein the cladding has been removed from all the fiber tip before it was coated with the thin metallic material. Here the evanescent filed is exposed to the immersion medium, out-side the fiber, from all the cylindrical surface of the fiber core.

FIG. 8 depicts a schematic of a fiber cross sectional area 80, similar to what was used in our prior art of a fiber optic hydrophone, wherein the cladding has been removed from all the fiber tip before it was coated with a thin metallic material. Here the evanescent filed is exposed to the immersion medium, out-side the fiber tip, from all the cylindrical surface of the single mode fiber core, wherein, the core 81 of the fiber is covered by the clad material 83, which is removed completely off the fiber core 82 in the tip region, and coated with a thin layer of gold 84 or any other metallic or dielectric material.

Figure 9:
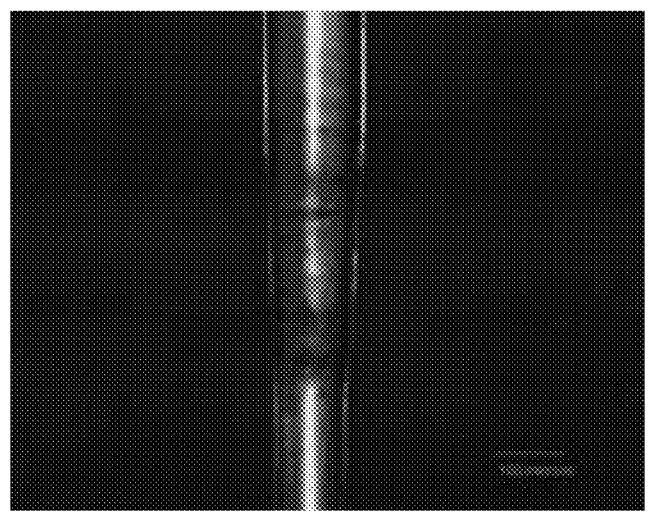
FIG. 9 is a picture for just illustration of the fiber tip during the etching process of the fiber shown in FIG. 8, using a scanning electron microscope (SEM).

FIG. 9 depicts a picture of the fiber tip during the etching process, as recorded by a scanning electron microscope SEM, for the case of full etching of the cladding around the fiber core. As described before, etching the cladding material (partially or totally) can be summarized as: (a) conical etching of the cladding material at the end of the fiber, as shown in FIG. 2, to limit interference between incident and reflected ultrasound waves whatever for regular optical fibers or highly doped fiber core, (b) a limited etching of the cladding material along the fiber tip, from one side, constructing a D-shaped tip cross-section as shown in FIG. 3, to improve the mechanical strength of the sensing part, (c) more etching of the cladding material, from one side, to increase the exposed core surface area in contact with immersion medium as showing in FIG. 7 with the V-shaped cross-section of the fiber tip, and (d) total etching of the cladding material exposing all the fiber core surface to immersion medium is as shown in FIG. 8.

The mechanical strength is much higher in (a) structure than all (b) to (d), and the (b) structure is higher in strength than (c) and (d), wherein, the (d) structure is the weakest one. This should be considered for various applications. In consideration of the sensor sensitivity, the (a) structure is much less sensitivity than all the others (b-d), because it is based on direct interaction between the optical signals within the fiber core and immersion medium at only the fiber end face, with no direct interaction between evanescent fields and immersion medium, from the side surface of the fiber core, not as in cases of (b-d) structures. However, the structures b, c, and d can have the same responses if the exposed surface areas became equal, which required different lengths of the sensing part of the fiber tip, wherein the (b) structure will be longer than the (c) structure, which is longer than the (d) structure. The selection of the proper sensor for each application depends on many factors including, but not limited to, the ultrasound frequency range and power, the immersion medium, environmental conditions, stability of the system, and others.

As noted above, it is expected that any of those described fiber optic hydrophones be used in a variety of applications. Also, those fiber optic hydrophones may be manufactured and optimized for a particular use. Uses include calibration of medical devices. In one example of a calibration, the fiber optic hydrophone disclosed herein may be placed near or in the focal zones of High Intensity Focused Ultrasound (HIFU) fields, High Intensity Therapeutic Ultrasound (HITU) fields, or Lithotripsy devices. The fiber optic hydrophone may be used to calibrate any device used to create HIFU or HITU fields, as well as any other medical ultrasound device, including those used for ultrasound imaging. As another example, a number of this novel hydrophone can be arranged in an array of fiber optic 1-D or 2-D hydrophones for 2-D or 3-D imaging for biomedical applications, and others. The array may detect signals in a reflective or transmissive mode from a source and may image one or more objects based on the reflections. As another example, the fiber optic hydrophone may be used in sonar applications, to detect changes in pressure underwater or to image objects underwater. As another example, detection of pressure amplitude may be used in diagnosis, treatment and therapy of a broad range of issues in humans or animals. In one configuration, the hydrophones may be used in situ. In another example, the hydrophones may be used in vivo and, in another application, the fiber optic hydrophones described herein may be used in an in vitro application. In another application the optical hydrophone might be used for reception of acoustic/ultrasound pressure from one end of solid barrier to another end in various sealed compartments of military applications of surface vessels, land-based rovers, airborne/space borne structures, or alike.

The device described herein may be used as a single point fiber optic hydrophone for characterization of one or more acoustic signals, using doppler-effect or other modulation and demodulation techniques available with this novel fiber optic hydrophone. As another example, an array of fiber optic hydrophones, as described above in FIGS. 2-8 may be provided. The array could be, for example, a linear array (1-D) comprising two or more fiber optic hydrophones. As another example, a two-dimensional (2-D) array could be created out of three or more hydrophones. For example, fiber optic hydrophones could be placed in a circular array, a triangular array, a square, a sparse array, a rectangular array or in an amorphous array. Such an array could be used to image or to characterize one or more aspects of an acoustic wave front in an immersion contact medium or a solid.

These acousto-optic imaging systems can be used in biomedical applications. They have so many advantages for many applications, including, but not limited to, cancer tumor imaging in the very early stages. They all have much better sensitivity and resolution that all/any available ultrasound imaging systems, and they are all much safer on human and animal health than any/all MRI and microwave imaging systems.

Figure 10:
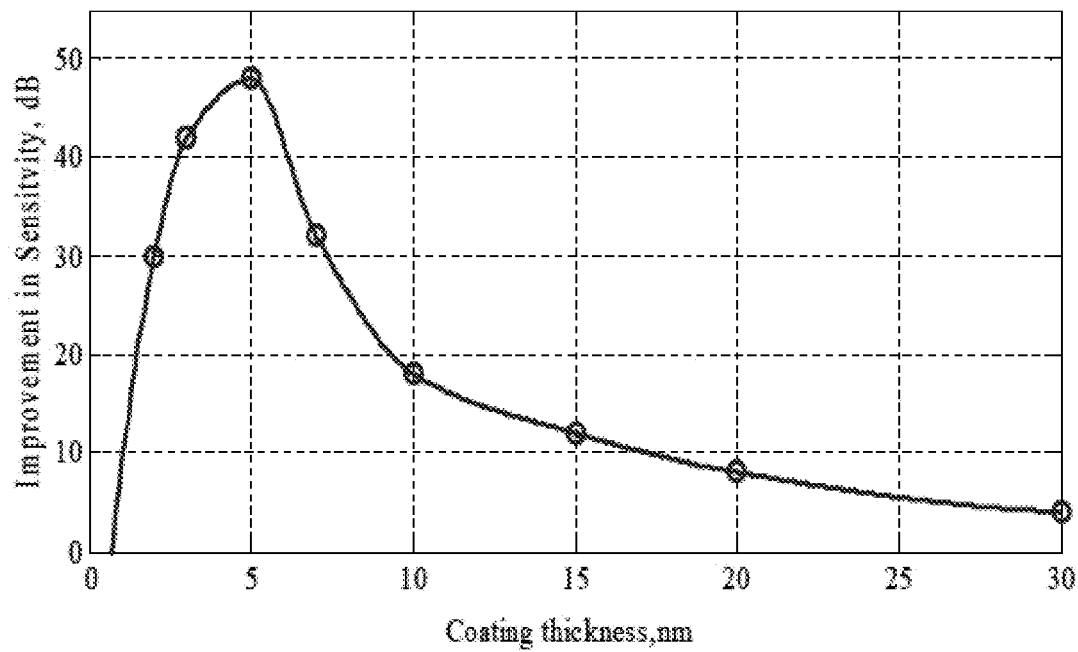
FIG. 10 depicts of experimental results, on measuring the sensor sensitivity, as a function of the coating thickness, of the hydrophone structure shown in FIG. 8, wherein the cladding has been removed-off the cylindrical surface of the fiber core and coated at different coating thickness, with a metallic gold material, wherein the coating covers the side surfaces of the tip as well as the tip end face.

FIG. 10 depicts an accurate experimental testing results, on measuring the fiber optic sensor/hydrophone sensitivity at 1550 nm, at different thickness of the gold coated layer on the tip of the fiber optic probe, as shown in FIG. 8, which is the surface in contact with the immersion medium. Before coating with the gold material, the diameter of the fiber tip, in this experiment, was reduced to about 6 µm, wherein, the fiber was cylindrically etched, as shown in FIG. 9, before the gold coating was applied. Because of the large number of parameters and factors involved in the calculation and calibration of the sensor sensitivity, as explained before, it is preferred, as the only available accurate process, to experimentally characterize and calibrate the relation between the thickness of the gold coating layer and the sensor sensitivity.

The results shown herein are for specific properties and geometry for the fiber tip and the coating as well as for a specific immersion medium and at specific ultrasound pressure and frequency. The view graph indicates the sensitivity in dB while the coating thickness is in nm. It is clear from the graph that the improved sensitivity recorded, for this specific materials and structures, is for a gold thickness of about 5 nm. These results are in agreement with the well know properties of nano structure metallic materials, wherein, the material is acting at this thickness as a semi-transparent medium, and the interaction between optical signals within the fiber core and ultrasound waves in immersion medium is at the improved condition for sensor response and sensitivity. For sure, different materials and structures will result in different optimized coating thickness, however, the expected changes will not be more than few nm in the coating thickness, as disclosed in this patent application.

Figure 11:
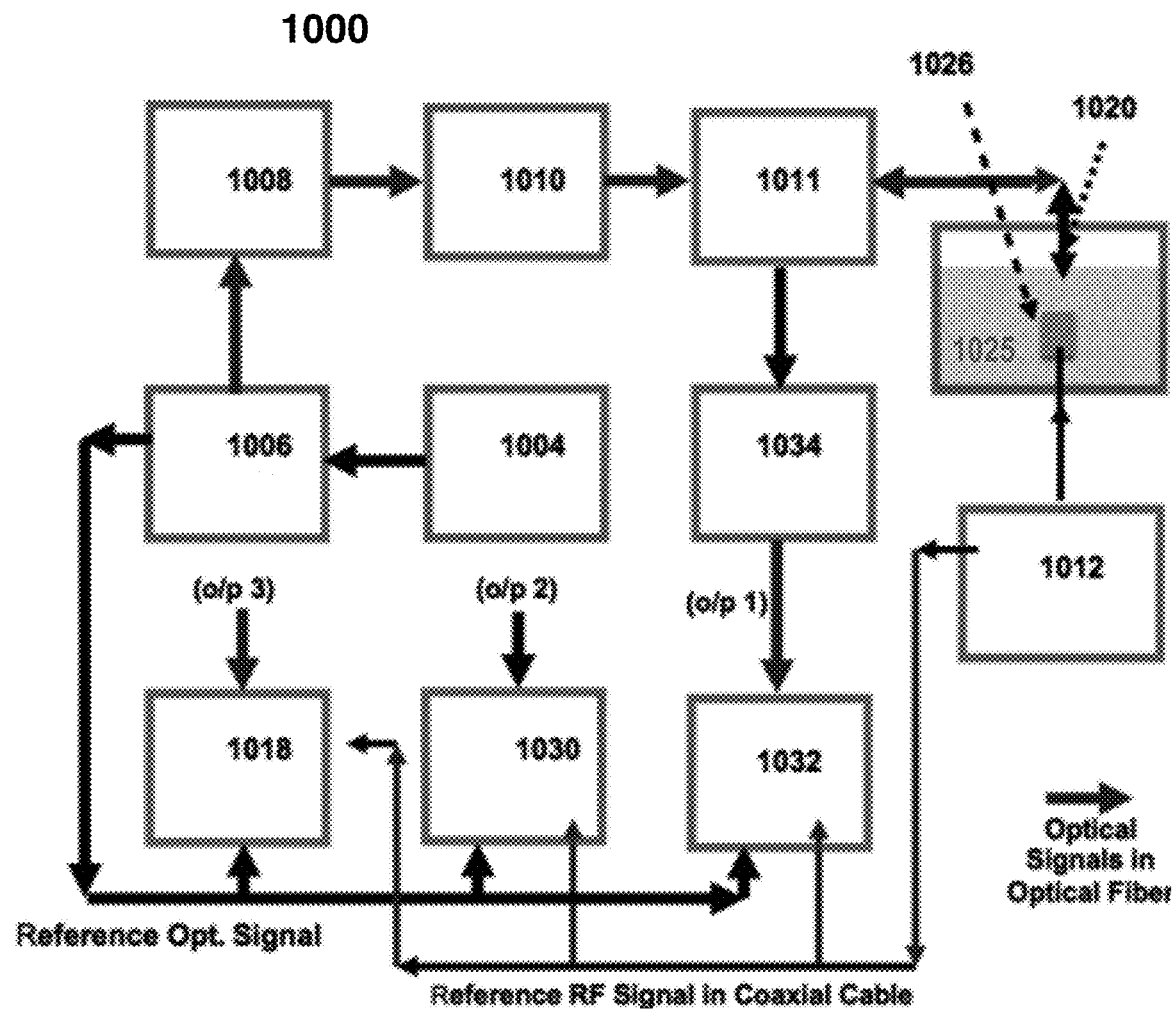
FIG. 11 is a schematic function/block diagram of the developed fiberoptic hydrophone, showing some of major components within the developed acousto-optic imaging and/or calibration system.

FIG. 11 depicts a function/block diagram of a fiber optic hydrophone 1000 that includes an optical probe 1020 in communication with a light source 1004 that is in communication with a fiber optic coupler 1006, optical amplifier and signal conditioner 1008, optical isolator 1010, and optical directional coupler 1011. The optical signal generated by the light source 1004, which is a coherent or non-coherent light source and can be a sing frequency of multiple frequencies or broadband light source, is transmitted through the coupler 1006, the optical amplifier 1008, the optical isolator 1010, and the optical coupler 1011 to the custom designed fiber probe 1020, as optical hydrophone. This fiberoptic hydrophone is applied as a pressure sensor for measuring the pressure of ultrasound waves existing within the immersion medium 1025. Also, this fiber optic hydrophone is applied as an ultrasound calibration sensor, based on the proper of Doppler-effect or applied a hydrophone calibration system. The back reflected and modulated optical signals are directed through the other port of optical directional coupler 1011 to the unit 1034 for optical signal conditioning and processing. The output (o/p) of the conditioner 1034 is directed to three units, for optical signal detection, demodulation, and analysis as; (o/p 1) unit is for signal intensity analysis, (o/p 2) unit is for signal phase analysis, and/or (o/p 3) unit is for signal wavelength analysis. Wherein the back reflected and modulated optical signals (due to acousto-optic waves interactions) are detected and demodulated through the three detection units (1032, 1030, and 1018), for the intensity, optical phase or/and wavelength analysis, respectively. Those three detection units are calibrated for direct reading of the ultrasound pressure measurements and output evaluation, as well as correlation to the ultrasound pressure in immersion medium next to the fiber probe tip.

Acousto-optic effects and other interaction phenomena, and/or mechanisms including Doppler-effect, result in modulating the back reflected optical signals, reflected off/from the partial transparent metallic coating material, on the exposed side-surface of the fiber core and/or the core end face. Modulation of back reflected optical signals includes, but not limited to, intensity, phase and/or wavelength modulation. The optical detection device/system may analyze the back reflected signals, and be capable of correlating the demodulated signals with the ultrasound pressure induced in immersion medium due to the ultrasound waves propagating within the medium.

The unit 1032 is for optical signal's intensity detection and demodulation. The unit 1030 is for optical signal's phase detection and demodulation, wherein different types of phase detection devices/systems can be applied. The unit 1018 is for measuring changes in wavelength, wherein spectrum analyzers or other devices or techniques can be applied.

A power amplifier and RF generator 1012 generate a signal for transmission through an acoustic/ultrasound generator (i.e., transducer) 1026. Also, a reference RF signal from the RF generator 1012 is directed to the three output units 1030, 1032, and 1018 for signal stability measurements, and correlation. In addition, all the three units; spectrum/wavelength analyzer unit 1018, the optical phase demodulation unit 1030, and the intensity demodulation unit 1034 receive a reference optical signal from the light source 1004, through the optical coupler 1006 in addition to the acoustic/ultrasound signal from the acoustic/ultrasound electric generator 1012.

The design of the detection device/system of the developed sensory/imaging fiberoptic probe is based on one of the standard stat-of-the-art detection devices/systems required for demodulation of the back reflected signals. Three detection options are shown for illustration in the schematic function diagram FIG. 11; however, other detection and demodulation techniques can be used too. In FIG. 11, a standard photodetector 1034 (o/p 1) is presented for intensity demodulation, a standard phase or interferometric detection system 1030 (o/p 2) is presented for optical phase demodulation, and one of the standard wavelength change measurement device/system 1018 (o/p 3), such as an array of photodetectors combined with blazed gratings, or any other optical spectrum analyzer, is presented for wavelength change measurements.

Demodulation of the back reflected signals within the fiber core can result in a very sensitive method/system for measuring ultrasound pressure in immersion mediums, or for calibration of ultrasound source or other hydrophone devices. This newly developed method provides a highly sensitive and accurate sensory system, that can be tuned for a high resolution and large dynamic range. This sensory system can be applied in different modes (intensity, phase, or wavelength) for different applications, based on the level of sensitivity and accuracy required, especially for acousto-optic imaging and/or calibration application. For macro scale imaging; the intensity demodulation (o/p 1) mode can be the improved choice because of reasonable costs, wherein the sensitivity, accuracy, and resolution are reasonable and acceptable. On the other hand, for a micro scale imaging; phase and/or wavelength demodulation (o/p 2 and o/p 3) modes are both improved choices, because of the higher sensitivity, accuracy, and resolution. However, those two approaches are more expensive than the intensity demodulation mode and require more system stability against environmental conditions. This presented in the functional diagram, FIG. 11, which is for illustration and other components can be added in the scope of the function of each component. The output of the fiberoptic probe can be correlated directly to ultrasound pressure in whatever immersion medium. This correlation can be applied for hydrophone calibration or for imaging of very small objects, such as cancer tumors, blood vessels, or others, for medical diagnostics or similar applications.

This invention will form the base for a novel Acousto-optic Imaging System (AOIS), which can have many essential advantages than all available biomedical imaging systems including, but not limited to, Ultrasound Imagining Systems, X-ray, CAT Scan, MRI, and others. It is very safe for human health and has the required sensitivity and resolution for so many biomedical applications.

EMBODIMENTS

1—A sensory system for detecting ultrasound pressure waves in an immersion medium, wherein the system comprising;

a special optical fiber cable/probe having a highly doped fiber core surrounded by a fiber cladding layer, wherein the optical fiber end face is coated with a thin layer of a metallic material;

immersing the coated fiber tip in an immersion medium provides a surface contact with immersion medium;

wherein the thickness of the thin layer coating is selected based on improved sensory conditions of back reflected optical signals;

wherein improved sensory conditions are based on high sensitivity detection of ultrasound pressure waves in contact with the tip of the highly doped fiber core in immersion medium;

wherein the coating thickness is adjusted to maximize modulation of back reflected optical signals based on interaction of optical electromagnetic fields with ultrasound fields within the area of the fiber end as well as within the immersion medium next to the fiber tip;

wherein the fiber optic probe is integrated with an optical signal source and a specific detection system based on the required optical demodulation needed for detection of changes in the optical signal intensity, phase, or wavelength changes;

wherein the detection system is detecting any changes in optical back reflected signals and correlating these changes with the ultrasound pressures within the immersion medium, next to the tip of the sensory probe.

2—The system of embodiment 1 further comprising a modified optical fiber, wherein, the diameter of the core of the single mode optical fiber can be as small as 5 micros.

3—The system of embodiment 1 further comprising a modified optical fiber, wherein, the fiber cladding has been etched around the end face of the highly doped fiber core in a conical/tapered end shape, before coating the fiber tip with the metallic material. The conical taper angle can range from 20 to 45 degree, or others, based on the geometrical structure of the fiber and the medium surrounding the fiber tip.

4—The system of embodiment 1 further comprising a modified optical fiber, wherein, the fiber end face is coated with a thin layer of a metallic or dielectric materials, acting as a semitransparent coating.

5—The system of embodiment 1 further comprising a modified optical fiber, wherein, the thickness of the semitransparent coating is adjusted for improved interaction between the optical signals and ultrasound wave, based on the interface properties of the three materials at the fiber end, the optical fiber, the coating material, and the immersion medium.

6—The system of embodiment 1 further comprising a regular optical fiber, wherein, applications are not at ultra-high ultrasound frequencies.

7—The system of embodiment 3 further comprising a modified optical fiber, wherein, the cladding of the fiber tip, which has a tapered end, has been etched away or removed-off the fiber core surface from one side of the fiber, leaving a plane surface in tangent to the fiber core, constructing a D-shaped fiber tip.

8—The system of embodiment 7 further comprising a modified optical fiber, wherein, the plane surface can be not directly in tangent to the cylindrical surface of the core, and the distance between them can be selected based on the requirement of evanescent field penetration depth in the immersion medium.

9—The system of embodiment 7 further comprising a modified optical fiber, wherein, the D-shaped fiber tip has been coated with a thin layer of metallic or dielectric material onto the flat surface created at the fiber tip as well as the fiber end-face.

10—The system of embodiment 9 further comprising a modified optical fiber, wherein, the metallic coating has to be a semitransparent coating for the evanescent fields, and can be of the range 2 nm to 10 nm, depending on the application requirements as well as the structural materials properties.

11—The system of embodiment 7 further comprising a modified optical fiber, wherein, part of the cladding of the D-shaped fiber tip, which has a tapered end, has been removed-off from one side to the fiber core, leaving a second plane surface, and constructing a V-shaped fiber cross-section along the fiber tip.

12—The system of embodiment 11 further comprising a modified optical fiber, wherein, the angle between the first and the second plane surface, at the fiber modified tip, can range between 90 to 180 degrees.

13—The system of embodiment 11 further comprising a modified optical fiber, wherein, the first and second plane surfaces of the V-shaped fiber tip have been coated with a very thin layer of metallic and/or dielectric materials as well as the fiber end-face.

14—The system of embodiment 13 further comprising a modified optical fiber, wherein, the metallic coating has to act as a semitransparent coating for the evanescent fields, and can be of the range 2 nm to 10 nm, depending on the application requirements as well as the structural materials properties.

15—The system of embodiment 1 further comprising a light source, wherein the light source is a laser diode or light emitting diode or any single frequency light source or broadband light sour.

16—The system of embodiment 1 further comprising an optical detection and analyze devices/system, wherein the optical detection and analyze devices/system are used to measure changes in the optical signals (intensity, phase, and/or wavelength) and correlate these changes with the ultrasound pressure in the immersion medium.

17—A method for detecting ultrasound pressure waves in an immersion medium, wherein the sensory detection method comprising;
a special optical fiber cable/probe having a highly doped fiber core, for limiting penetration of the evanescent field into the materials outside the fiber core;
wherein the core is surrounded by a layer of cladding materials, wherein the probe tip is coated with a very thin layer of a metallic material, acting as a semitransparent coating for electromagnetic fields;
immersing the coated fiber tip in an immersion medium provides a surface contact with immersion medium;
wherein the thickness of the thin layer coating is selected based on improved sensory conditions of back reflected optical signals;
wherein improved sensory conditions are based on high sensitivity detection of ultrasound pressure waves in contact with the end face of the highly doped fiber core in immersion medium;
wherein the coating thickness is adjusted to maximize response to modulation of back reflected optical signals based on interaction of optical electromagnetic fields with ultrasound fields within the area of the fiber end as well as within the immersion medium next to the fiber tip;
wherein the fiber optic probe is integrated with an optical signal source and a specific detection system based on the required optical demodulation needed for detection of changes in the optical signal intensity, phase, or wavelength changes;
wherein, the detection system is detecting any changes in of optical back reflected signals, such changes are in the intensity, phase or wavelength of back reflected optical signals, and correlating these changes with the ultrasound pressures within the immersion medium, next to the tip of the sensory probe.

18—The method of embodiment 17 further comprising a modified optical fiber, wherein, the diameter of the highly doped single mode fiber core can be as small as 5 micros.

19—The method of embodiment 17 further comprising a modified optical fiber, wherein, the fiber cladding has been etching around the end face of the highly doped fiber core in a conical/tapered end shape, before coating the fiber tip with the metallic material. The conical taper angle can range from 20 to 45 degree, or others, based on the geometrical structure of the fiber and the medium surrounding the fiber tip. Tapering the tip of the optical fiber is a can be done to avoid multiple reflections of the ultrasound in case of strong signals, as well as limiting interference between incident and reflected ultrasound waves in the medium next to the fiber end face.

20—The method of embodiment 17 further comprising a modified optical fiber, wherein, the thickness of the semi-transparent coating is adjusted for improved interaction between the optical signals and ultrasound wave, based on the interface properties of the three materials at the fiber end, the optical fiber, the coating materials, and the immersion medium.

21—The method of embodiment 17 further comprising a regular optical fiber, wherein, applications are not at ultra-high ultrasound frequencies.

22—The method of embodiment 19 further comprising a modified optical fiber, wherein, the cladding of the fiber tip, which has a tapered end, has been etched away or removed-off the fiber core surface from one side of the fiber, leaving a plane surface in tangent to the fiber core, and constructing a D-shaped cross-section along the tip.

23—The method of embodiment 22 further comprising a modified optical fiber, wherein, the plane surface can be not directly in tangent to the cylindrical surface of the core, and the distance between them can be selected based on the requirement of evanescent field penetration depth in the immersion medium.

24—The method of embodiment 22 further comprising a modified optical fiber tip, wherein, the D-shaped fiber tip has been coated with a thin layer of metallic or dielectric material onto the flat surface created at the fiber tip as well as the fiber end-face.

25—The method of embodiment 24 further comprising a modified optical fiber, wherein, the metallic coating has to be a semitransparent coating for the evanescent fields, and can be of the range 2 nm to 10 nm, depending on the application requirements as well as the structural materials properties.

26—The method of embodiment 22 further comprising a modified optical fiber, wherein, part of the cladding of the D-shaped fiber tip, which has a tapered end, has been removed-off from one side to the fiber core, leaving a second plane surface, and constructing a V-shaped fiber cross-section along the fiber tip. This V-shaped structure will increase the interface area of the evanescent fields for more sensitivity, if it is required based on the system conditions and properties.

27—The method of embodiment 26 further comprising a modified optical fiber, wherein, the angle between the first and the second plane surface, at the fiber modified tip, can range between 90 to 180 degrees.

28—The method of embodiment 26 further comprising a modified optical fiber, wherein, the first and second flat surfaces of the V-shaped fiber tip have been coated with a very thin layer of metallic and/or dielectric materials as well as the fiber end-face.

29—The method of embodiment 28 further comprising a modified optical fiber, wherein, the metallic coating has to act as a semitransparent coating for the evanescent fields, and can be of the range 2 nm to 10 nm, depending on the application requirements as well as the structural materials properties.

30—The method of embodiment 29 further comprising a fiber optic probe sensitive to ultrasound pressure waves in immersion medium based on said direct interaction of optical signals and evanescent electromagnetic fields within the fiber optic probe with ultrasound fields within the immersion medium next to the surface contact region of the probe tip.

31—The method of embodiment 17 further comprising a light source, wherein the light source is any type of laser, or laser diode or light emitting diode or any single frequency light source or broadband light sour. The selection of the light source depends on the immersion medium properties as well as the ultrasound wave frequencies used for certain application.

32—The method of embodiment 17 further comprising an optical detection and analyze devices/system, wherein the optical detection and analyze devices/system are used to measure changes in the optical signals (intensity, phase, and/or wavelength) and correlate these changes with the ultrasound pressure in the immersion medium.

33—The method of embodiment 32 wherein the detector device is a regular photodetector for intensity change measurements.

34—The method of embodiment 32 wherein the detector device is an interferometric detection system/device for phase change measurements.

35—The method of embodiment 32 wherein the detector device is an optical spectrum analyzer, or other system, capable of measuring wavelength changes if back reflected signal.

36—The method of embodiment 32 further comprising an analyzing device for generation of correlation between demodulated back reflected signals and the ultrasound waves in the immersion medium.

37—The method of embodiment 32 further comprising an imaging system, wherein the correlation between changes in back reflected optical signals and ultrasound pressure in immersion medium is used for the detection of objects in immersion medium.

38—The method of embodiment 32 further comprising 2-D array of sensory probes, arrange on a flat surface or a curved surface or on a hemispherical surface for 3-D imaging of objects, tumors, or others based on detection of back reflected ultrasound wave off the surface of these objects, tumors or others for biomedical application or other alike.

39—The method of embodiment 32 further comprising a sensory system for calibration of ultrasound hydrophone systems.

Additionally, the subject matter of the present disclosure includes combinations and sub-combinations of the various processes, systems and configurations, and other features, functions, acts, and/or properties disclosed herein, as well as equivalents thereof.

The general description and the following detailed description are exemplary and explanatory only and are not restrictive of the invention, as defined in the appended claims. Other aspects of the present invention will be apparent to those skilled in the art in view of the detailed description of the invention as provided herein.

What is claimed:

1. A sensory system for detecting ultrasound pressure waves in an immersion medium, the system comprising;
    an optical fiber probe including a doped fiber core surrounded by a fiber cladding layer, wherein the optical fiber probe includes an end face coated with a layer of a metallic material;
    wherein immersing the end face in an immersion medium provides a contact with the immersion medium, wherein detecting a pressure in the immersion medium is based on interaction between evanescent electromagnetic fields that exist outside the optical fiber probe surface and ultrasound waves propagating in the immersion medium or solid;
    wherein the end face includes a tapered end wherein the fiber cladding that has been etched away or removed from one side of the optical fiber probe leaving a planar surface that forms a D-shaped fiber tip.

2. The system of claim 1 further comprising a modified optical fiber, wherein a thickness of the layer is selected based on sensory conditions of back-reflected optical signals generated from the optical fiber probe.

3. The system of claim 1, wherein the metallic material acts as a semitransparent coating.

4. The system of claim 3, wherein the thickness of the semitransparent coating is based on interface properties of the optical fiber, the metallic material, and the immersion medium.

5. The system of claim 1, wherein the D-shaped fiber tip has been coated with a thin layer of metallic or dielectric material onto the flat surface created at the fiber tip as well as the fiber end-face.

6. The system of claim 1, wherein the metallic coating has a thickness of between 2 nm to 10 nm.

7. The system of claim 1 further comprising a light source, wherein the light source is a laser diode or light emitting diode or any single frequency light source or broadband light source.

8. The system of claim 1 further comprising an optical detection and analyze devices/system, wherein the optical detection and analyze devices/system are used to measure changes in the optical signals (intensity, phase, and/or wavelength) and correlate these changes with the ultrasound pressure in the immersion medium.

\* \* \* \* \*